United States Patent

Garcia

[11] 3,946,651
[45] Mar. 30, 1976

[54] BROILER

[76] Inventor: Joel H. Garcia, 607 E. Colorado St., Fairfield, Calif. 94533

[22] Filed: Jan. 29, 1974

[21] Appl. No.: 437,735

[52] U.S. Cl. ............................ 99/444; 99/450
[51] Int. Cl.² .................. A47J 36/20; A47J 37/06
[58] Field of Search ............ 99/450, 293, 308, 310, 99/313, 323, 339–340, 403, 410–411, 412–413, 414–415, 416–417, 418, 425, 446–447, 448, 443, 444–445; 126/9, 25, 214, 221, 275

[56] References Cited
UNITED STATES PATENTS

| | | | |
|---|---|---|---|
| 77,884 | 5/1868 | Isham | 99/340 |
| 113,011 | 3/1871 | Boesen et al. | 99/417 |
| 127,900 | 6/1872 | Lee | 99/450 X |
| 586,005 | 7/1897 | Black | 99/403 X |
| 594,993 | 12/1897 | Harry | 126/9 R |
| 676,479 | 6/1901 | Wagner | 99/450 X |
| 1,471,039 | 10/1923 | Lee | 99/445 |
| 1,740,205 | 12/1929 | Schmidt | 99/415 X |
| 2,796,823 | 6/1957 | Solomon | 99/310 X |
| 2,820,446 | 1/1958 | Freeman | 126/25 |
| 2,940,381 | 6/1960 | Cottongim et al. | 99/445 |
| 2,943,557 | 7/1960 | Suehlsen | 99/443 R X |
| 3,211,082 | 10/1965 | Sachnoff et al. | 99/444 |
| 3,359,963 | 12/1967 | Kostial | 126/9 |

FOREIGN PATENTS OR APPLICATIONS

| | | | |
|---|---|---|---|
| 47,608 | 3/1937 | France | 99/425 |

Primary Examiner—Stanley N. Gilreath
Assistant Examiner—Arthur O. Henderson
Attorney, Agent, or Firm—Blair & Brown

[57] ABSTRACT

A broiler is provided for use with or above a heat source such as a conventional burner of a kitchen stove or outside barbecue device. The broiler includes a frame as well as a plurality of vertically spaced grease trays mounted therein and having openings that are offset with respect to openings in the tray above or below.

3 Claims, 3 Drawing Figures

U.S. Patent  March 30, 1976  3,946,651
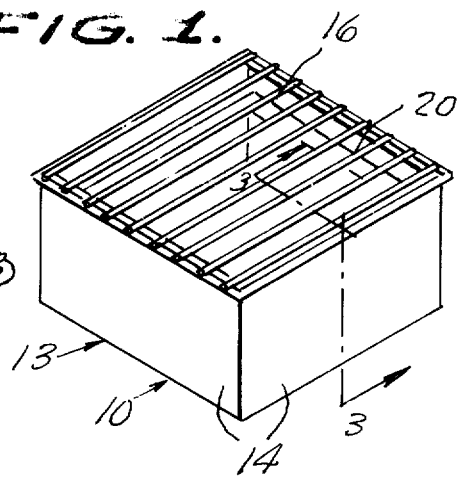
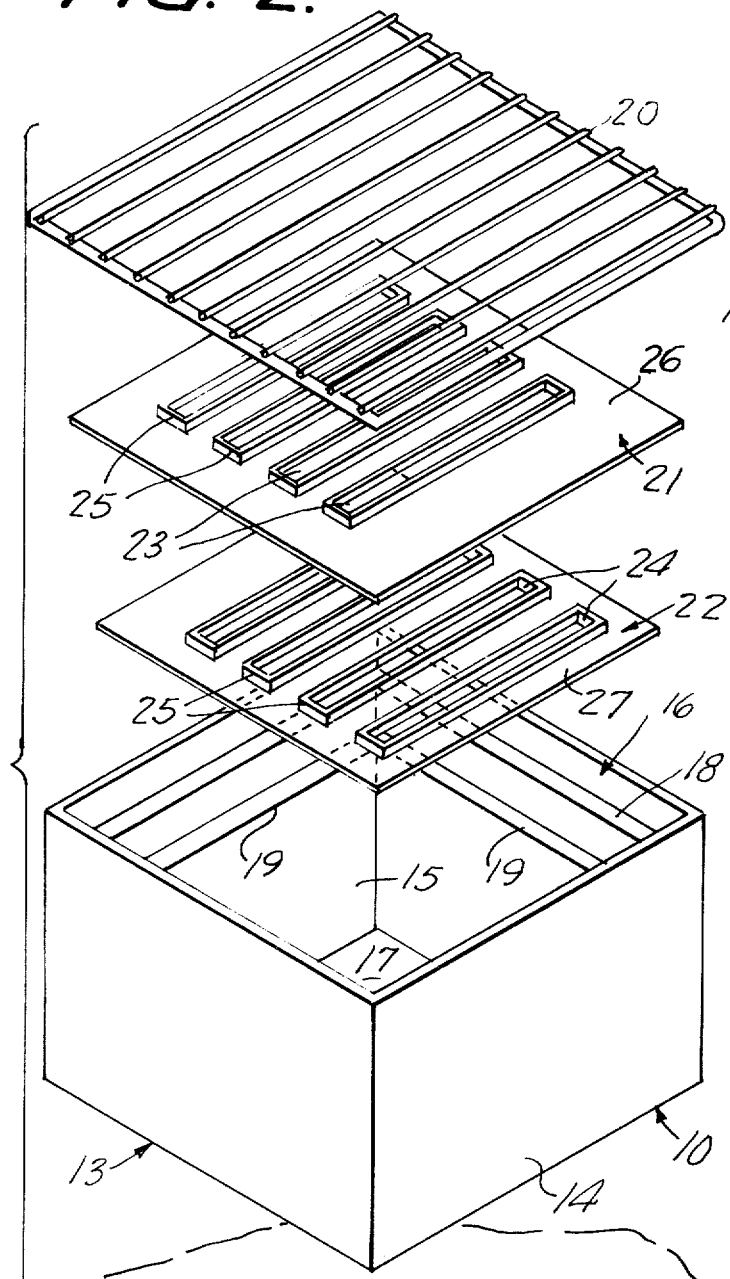
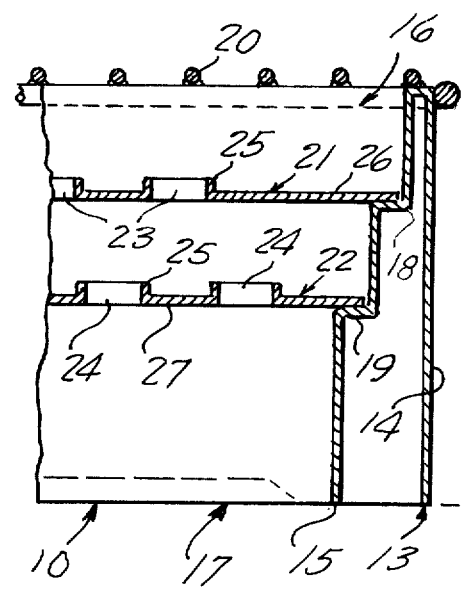
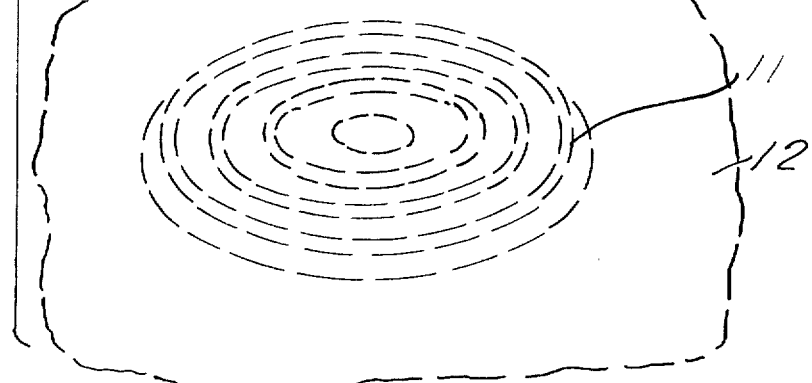

BROILER

BACKGROUND OF THE INVENTION

Field of the Invention

The present invention relates to broilers, and more particularly to broilers or cooking devices for food stuff such as meats and the like.

SUMMARY OF THE INVENTION

A broiler is provided for food stuff such as steak or other food products wherein a frame or box like unit is adapted to be mounted above a burner, barbecue device or the like. The broiler is provided with a plurality of vertically spaced grease trays that have horizontally offset openings therein whereby foods being cooked or broiled will receive heat from the heat source therebelow and wherein the meat juices or grease will be prevented from falling straight down into the fire and causing flame-up.

The primary object of the present invention is to provide a broiler that is constructed in so that meat juices, grease, fat and the like will not fall straight down into the fire therebelow so that flame-up will be minimized or prevented.

Other objects and advantages will become apparent in the following specification when considered in light of the attached drawings.

BRIEF DESCRIPTION OF THE DRAWINGS

FIG. 1 is a perspective view of the broiler;

FIG. 2 is an enlarged perspective view showing the parts separated for clarity of illustration; and FIG. 3 is an enlarged sectional view taken on the line 3—3 of FIG. 1.

DESCRIPTION OF THE PREFERRED EMBODIMENT

Referring now to the drawings in detail, wherein like reference characters indicate like parts throughout the several figures, the reference numeral 10 indicates the broiler of the present invention which is used in conjunction with or above any suitable type of heat source such as the burner 11 of a stove 12. The broiler 10 includes a box like unit 13 consisting of an outer portion 14 and an inner portion 15. The top 16 of the box 13 is open and likewise the bottom portion 17 is open, FIG. 3.

As shown in FIG. 3 the inner portion 15 has a step formation so that there is provided horizontally disposed steps 18 and 19. A grill 20 is mounted on the top of the broiler 10, and the grill 20 is used for supporting steaks or other foods being broiled or cooked.

As shown in the drawings a plurality of horizontally disposed grease trays 21 and 22 are mounted within the box 13 and the trays 21 and 22 are adapted to be conveniently supported on the steps 18 and 19. The tray 21 has a plurality of openings 23 therein and likewise the tray 22 has openings 24 therein with openings 23 and 24 horizontally offset with respect to each other so that these openings are not in vertical alignment with each other. The trays 21, 22 adjacent their respective openings 23 and 24 are provided with upwardly extending flanges 25, projecting above the solid portions 26, 27 of the trays 21, 22.

With the parts arranged as shown in the drawings, food such as steaks and the like is conveniently supported on the grill 20 and heat from the heat source 11 passes upwardly through the bottom 17 and through the openings 24 and 23 to cook the meat. The grease or drippings from the meat will not fall directly down onto the flame or heat source 11 since the openings 23 and 24 are arranged in horizontally offset relation with respect to each other, and thus grease will be collected on the trays 21, 22 and will be kept from contacting the heat source. The grease will have a tendency to gather on the solid portions 26 and 27, with the upstanding flanges 25 preventing the grease from passing down through the adjacent openings 23 and 24.

The parts can be made of any suitable material and in different shapes and sizes as desired or required.

The broiler unit of the present invention can be placed on a conventional burner of a kitchen stove or outside barbecue device. The broiler 10 includes the box like unit 13 that has sides but no top or bottom. Likewise, the trays 21 and 22 may be stamped out of thin disposable aluminum foil, and the trays 21 and 22 are placed so that they rest on the steps 18 and 19 inside of the box 13. It is to be understood that trays such as the trays 21 and 22 can be made of a more substantial aluminum or other suitable material if desired.

It will be noted that the openings 23 are not in vertical alignment with the openings 24. This prevents the meat juices or grease from falling straight down into the fire and causing flame-up. The flanges 25 are turned up as shown in the drawings so as to help retain much of the grease on the trays 21, 22.

Having thus described the preferred embodiment of the invention it should be understood that numerous structural modifications and adaptations may be resorted to without departing from the spirit of the invention.

What is claimed is:

1. A broiler for cooking food over an open flame comprising a generally rectangular box having an open bottom and open top, a food support grill mounted over the open top and supported on said box, a pair of grease trays, means in said box for supporting said trays within said box in vertically spaced relation below said grill, a plurality of elongate openings arranged in each of said trays in spaced parallel relation, with the openings in one of said trays horizontally offset from the openings in the other of said trays to prevent grease from falling from food cooking on said grill directly into the open flame.

2. A device as claimed in claim 1 wherein an upstanding flange is formed on said trays encompassing each of said openings.

3. A device as claimed in claim 2 wherein the means for supporting said trays includes a stepped inner portion of said box with said trays supported on steps of said stepped inner portion.

* * * * *